United States Patent
Hong et al.

(10) Patent No.: US 10,590,870 B2
(45) Date of Patent: Mar. 17, 2020

(54) METHOD OF CALCULATING EXHAUST GAS RECIRCULATION RATE USING COMBUSTION PRESSURE OF CYLINDER

(71) Applicants: HYUNDAI MOTOR COMPANY, Seoul (KR); KIA MOTORS CORPORATION, Seoul (KR); IUCF-HYU (Industry-University Cooperation Foundation Hanyang University), Seoul (KR)

(72) Inventors: Seungwoo Hong, Seoul (KR); Hyungbok Lee, Seongnam-si (KR); Yeongseop Park, Seoul (KR); Dong Hee Han, Seoul (KR); Haksu Kim, Daegu (KR); Myoungho Sunwoo, Seoul (KR); Donghyuk Jung, Seoul (KR)

(73) Assignees: HYUNDAI MOTOR COMPANY, Seoul (KR); KIA MOTORS CORPORATION, Seoul (KR); IUCF-HYU (Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/171,078

(22) Filed: Oct. 25, 2018

(65) Prior Publication Data
US 2020/0032726 A1  Jan. 30, 2020

(30) Foreign Application Priority Data
Jul. 30, 2018 (KR) .................. 10-2018-0088468

(51) Int. Cl.
F02D 41/00 (2006.01)

(52) U.S. Cl.
CPC ..... *F02D 41/0052* (2013.01); *F02D 41/0077* (2013.01); *F02D 2200/024* (2013.01)

(58) Field of Classification Search
CPC .. F02M 26/49; F02D 41/0052; F02D 41/0077
See application file for complete search history.

(56) References Cited

U.S. PATENT DOCUMENTS

| 5,361,745 A * | 11/1994 | Suzuki ............. F02D 35/023 123/435 |
| 6,321,732 B1 | 11/2001 | Kotwicki et al. |

(Continued)

FOREIGN PATENT DOCUMENTS

| JP | 5413506 B2 | 2/2014 |
| KR | 10-2016-0120600 A | 10/2016 |

*Primary Examiner* — Thomas N Moulis
(74) *Attorney, Agent, or Firm* — Morgan, Lewis & Bockius LLP

(57) ABSTRACT

A method of calculating an exhaust gas recirculation (EGR) rate using combustion pressure of a cylinder of an internal combustion engine includes: detecting, by a pressure sensor, the combustion pressure of the cylinder in real time; calculating, by a processor, a data characteristic of a combustion pressure waveform per cycle through principal component analysis based on the detected combustion pressure of the cylinder; calculating, by the processor, a moment of the combustion pressure waveform per cycle by calculating a probability distribution based on the detected combustion pressure of the cylinder; calculating, by the processor, the EGR rate using the calculated data characteristic, the calculated moment, and engine operating conditions; and controlling, by the processor, the EGR rate based on the calculated EGR rate and a target EGR rate.

11 Claims, 6 Drawing Sheets

(56) References Cited

U.S. PATENT DOCUMENTS

| | | | |
|---|---|---|---|
| 10,215,112 B1* | 2/2019 | Kang | F02D 35/023 |
| 2006/0225710 A1* | 10/2006 | Taglialatela-Scafati | F02D 35/023 123/486 |
| 2007/0079817 A1* | 4/2007 | VanDyne | F02D 35/021 123/568.21 |
| 2016/0258367 A1* | 9/2016 | Rauscher | F02D 35/024 |
| 2018/0223752 A1* | 8/2018 | Zhang | F02D 35/023 |

* cited by examiner

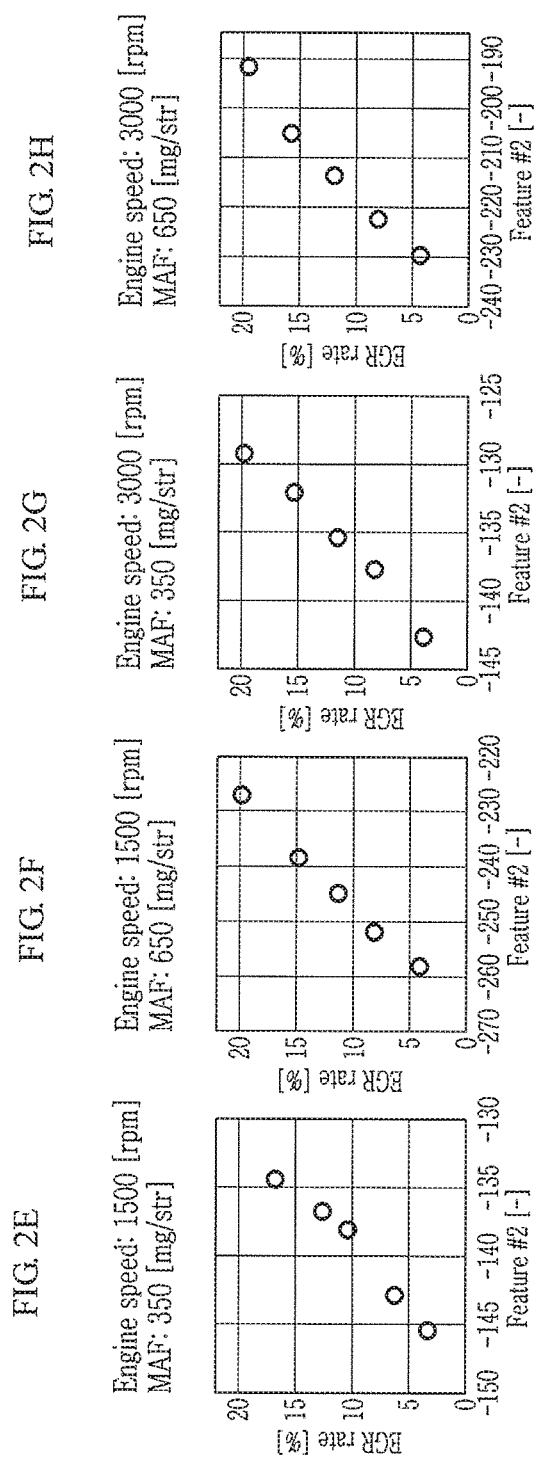

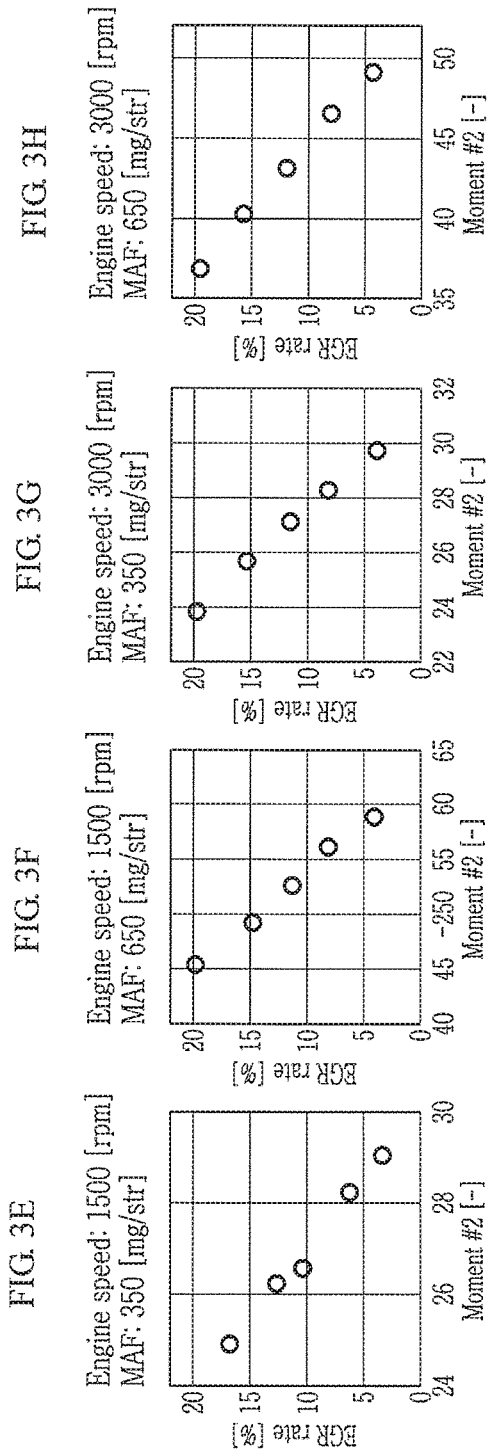

METHOD OF CALCULATING EXHAUST GAS RECIRCULATION RATE USING COMBUSTION PRESSURE OF CYLINDER

CROSS-REFERENCE TO RELATED APPLICATION

This application claims priority to and the benefit of Korean Patent Application No. 10-2018-0088468 filed in the Korean Intellectual Property Office on Jul. 30, 2018, the entire contents of which are incorporated herein by reference.

TECHNICAL FIELD

The present disclosure relates to a method of calculating an exhaust gas recirculation (EGR) rate using combustion pressure of cylinder of engine. More particularly, the present disclosure relates to a method of calculating an EGR rate based on combustion pressure information of a combustion pressure sensor mounted on a diesel engine cylinder.

BACKGROUND

In an internal combustion engine for a vehicle generally has an exhaust gas recirculation (EGR) system to meet the exhaust gas regulations. In particular, in a diesel engine, the exhaust gas regulations require to reduce the amount of particulate matter to a certain level. As one method, the amount of particulate matter can be reduced by reducing fuel consumption amount using the EGR system.

The EGR system returns some of the exhaust gas exhausted from an engine to an intake device of a cylinder to lower combustion temperature of the engine and to decrease NOx thereof, and an EGR valve and an EGR cooler are disposed such that the EGR gas is cooled to a predetermined temperature to be supplied to the intake manifold.

A rotational speed of the engine and the fuel injection amount are applied and the EGR valve is controlled by a feed forward control method so as to control the flux of the EGR gas, and a mass air flow sensor (MAF) detects the flux of the EGR gas.

The flux of the EGR gas that is determined by the rotational speed and the fuel injection amount of the engine can be varied by several factors such that the flow of the EGR gas cannot be reflected and a feedback control can be interfered in a particular condition. It is further difficult to overcome a time delay due to a response speed of a EGR flow path and various sensors. In addition, it is difficult to accurately estimate the EGR rate when there is an element that changes intake and exhaust pressures, such as a variable intake and exhaust valve and a turbocharger.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method of calculating an exhaust gas recirculation (EGR) rate which improves estimated performance and reliability by estimating a real time EGR rate using fast response performance of combustion pressure sensor, deducting combustion factors having a high correlation with the EGR rate and using them in an EGR rate estimation model.

A method of calculating an exhaust gas recirculation (EGR) rate using combustion pressure of a cylinder according to an exemplary embodiment of the present disclosure includes steps of: detecting, by a pressure sensor, the combustion pressure of the cylinder; calculating, by a processor, a data characteristic of a combustion pressure waveform per cycle through principal component analysis (PCA) based on the detected combustion pressure of the cylinder; calculating, by the processor, a moment of the combustion pressure waveform per cycle by calculating a probability distribution based on the detected combustion pressure of the cylinder; calculating, by the processor, the EGR rate using the calculated data characteristic, the calculated moment, and engine operating conditions; and controlling, by the processor, the EGR rate based on the calculated EGR rate and a target EGR rate.

In the step of calculating the data characteristic of the combustion pressure waveform through principal component analysis based on the detected combustion pressure of the cylinder, a singular vector is calculated from a singular value decomposition (SVD) from the previously obtained combustion pressure data set, and the data characteristic may be calculated by multiplying the combustion pressure of the cylinder detected in real time and the singular vector.

In the step of calculating the morphological characteristic of the combustion pressure waveform by calculating a probability distribution based on the detected combustion pressure of the cylinder, the morphological characteristic may be calculated by the following equation.

$$\text{Moment}_n = \int_{\theta_n}^{\theta_n} (\theta - \theta_c)^n P_{cyl}(\theta) \, d\theta$$

Here, Moment represents the morphological characteristic, n is 1 to 4, $\theta_c$ is a mean value of the combustion pressure waveform, and $P_{cyl}(\theta)$ is a combustion pressure of the cylinder at $\theta$.

The EGR rate may be calculated by considering a predetermined value ($dm_{Mafdset}$) of the mass flow rate of air, an engine speed ($N_{Eng}$), a value obtained by subtracting a spark timing from a crank angle at the time when combustion is advanced by 5%, the data characteristic, and the morphological characteristic.

At least one of the cylinders is provided, and the pressure sensor may be disposed corresponding to at least one of the cylinders.

The method according to an exemplary embodiment of the present disclosure may further include, after the step of detecting the combustion pressure of the cylinder: calculating heat generation rate; calculating a heat output; selecting the combustion phase; and calculating an indicated mean effective pressure (IMEP).

The heat generation rate may be calculated by a specific heat ratio of the gas, a volume of the cylinder, and the combustion pressure of the cylinder.

The combust phase may be selected from any one of crank angles for 5%, 0%, 50%, and 90% mass fraction burned.

The IMEP may be calculated by an exhaust volume, the combustion pressure of the cylinder, and the volume of the cylinder.

According to the exemplary embodiment of the present disclosure, it is possible to improve the estimation accuracy of the EGR rate by using the data characteristic and the morphological characteristic together with the combustion phase information.

In addition, it is possible to accurately and quickly calculate the EGR rate to improve the combustion stability and the exhaust gas quality, and to reduce the abnormal vibration and noise generated in the combustion process of the engine.

Further, by calculating the EGR rate through the pressure sensor, it is possible to delete the calculation of the EGR rate through the separate oxygen sensor.

BRIEF DESCRIPTION OF THE DRAWINGS

FIGS. 2A-2H are drawings illustrating a correlation of a feature, which is calculated in the method of calculating EGR rate using combustion pressure of cylinder according to an exemplary embodiment of the present disclosure, the engine driving condition, and the EGR rate.

FIGS. 3A-3H are drawings illustrating a correlation of a moment, which is calculated in the method of calculating EGR rate using combustion pressure of cylinder according to an exemplary embodiment of the present disclosure, the engine driving condition, and the EGR rate.

DETAILED DESCRIPTION OF THE EMBODIMENTS

Figure 1:
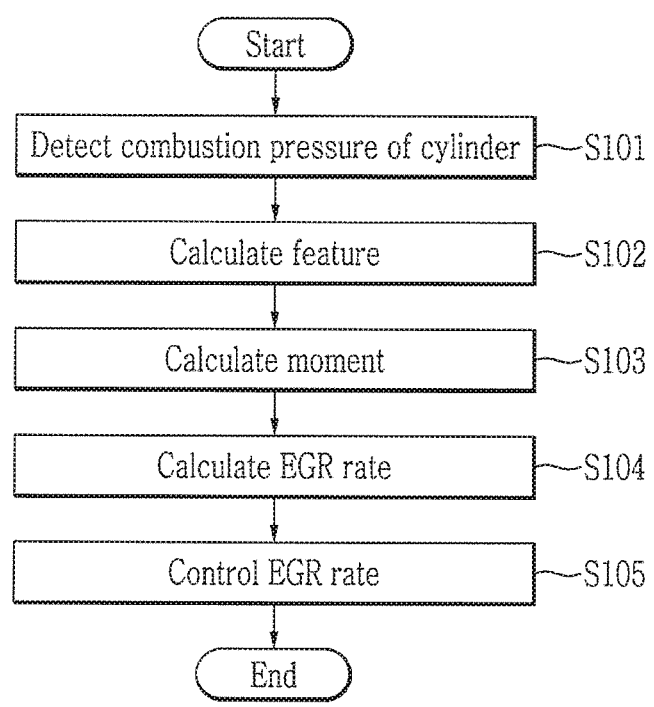
FIG. 1 is a flowchart illustrating a method of calculating an exhaust gas recirculation (EGR) rate using a combustion pressure of a cylinder according to an exemplary embodiment of the present disclosure.
Figures 2A, 2B, 2C, 2D:
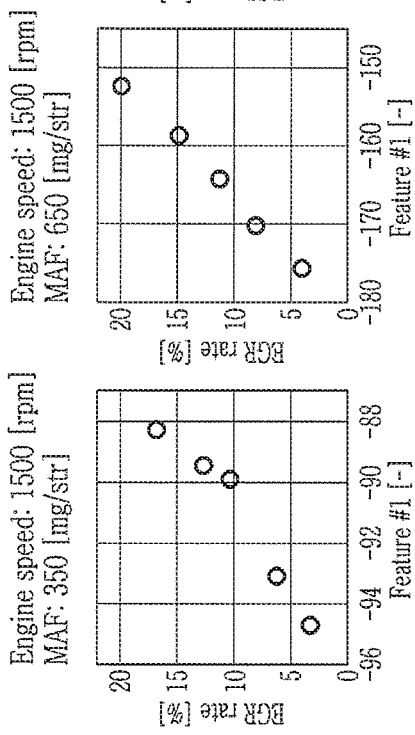
Figures 3A, 3B, 3C, 3D:
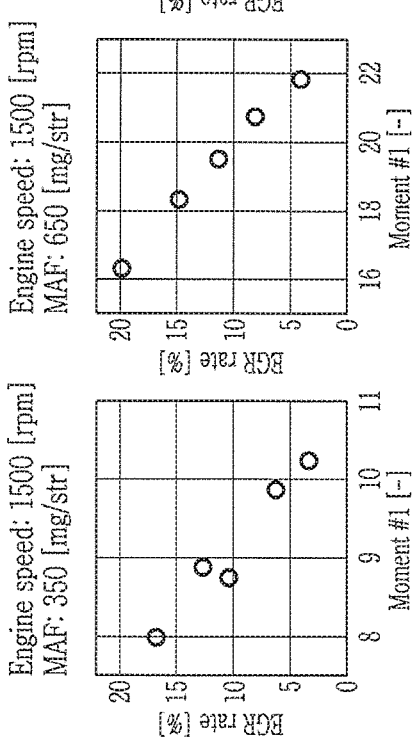

Hereinafter, the present disclosure will be described more fully with reference to the accompanying drawings, in which exemplary embodiments of the invention are shown. As those skilled in the art would realize, the described embodiments may be modified in various different ways, all without departing from the spirit or scope of the present disclosure.

Further, in the exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, same structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present disclosure shows an exemplary embodiment of the present disclosure in detail. As a result, various modifications of the drawings will be expected. Therefore, the exemplary embodiment is not limited to a specific aspect of the illustrated region, and for example, includes modifications of an aspect by manufacturing.

Hereinbelow, a method of calculating an exhaust gas recirculation (EGR) rate using combustion pressure of cylinder according to an exemplary embodiment of the present disclosure will be described with reference to FIG. 1.

FIG. 1 is a flowchart illustrating a method of calculating an EGR rate using a combustion pressure of a cylinder according to an exemplary embodiment of the present disclosure.

Referring to FIG. 1, a combustion pressure of a cylinder is detected (S101). The combustion pressure of the cylinder may be detected by a pressure sensor. At least one of a plurality of cylinders may be used, and one or more pressure sensors may be disposed corresponding to the at least one of the cylinders.

Then, a data characteristic (feature) of a waveform of the combustion pressure can be calculated through a principal component analysis (PCA) based on the detected combustion pressure of the cylinder (S102).

A singular vector $v_i$ can be calculated from a singular value decomposition (SVD) from a data set of the previously obtained combustion pressure for modeling.

The combustion pressure data set may be expressed by the following equation (1).

$$P_{cylset} = [P_{cyl}^T(1), P_{cyl}^T(2), P_{cyl}^T(3), \ldots, P_{cyl}^T(k)]^T \quad \text{equation (1)}$$

Here, the $P_{cylset}$ is the combustion pressure data set, and $P_{cyl}^T(k)$ is a combustion pressure waveform per one cycle.

One cycle of the engine is a total of two wheels, and can be calculated by the number of revolutions of a crankshaft of the engine. Thus, one cycle of the engine is 720 degrees in total, which can be regarded as −360 degrees to 360 degrees. For example, if it is sampled at a fraction of −60° to 190° in 0.5 unit, a total of 500 samples can be derived (250/0.5). That is, a combustion pressure waveform composed of 500 values per one cycle of the engine can be derived.

At this time, when the combustion pressure for a total of 80000 cycles (k=80000) is collected, the matrix size of the combustion pressure data set becomes [80000*500].

Then, by applying the SVD to the combustion pressure data set, the singular vector $v_i$ for the combustion pressure data set can be calculated. The singular value decomposition for an arbitrary m*n matrix in real space is defined by the following equation (2).

$$P_{cylset} = U \sum V^T = \sum_{i=1}^{n} \sigma_i u_i v_i^T \quad \text{equation (2)}$$

Here, U is an m*m orthogonal matrix, V is an n*n orthogonal matrix, S is an m*n rectangular matrix, si is an i-th singular value of a matrix $P_{cylset}$, ui is an i-th left singular vector, and $v_i$ is an i-th right singular vector.

The feature can be calculated by multiplying the singular vector $v_i$ derived from the above equations (1) and (2) by the combustion pressure $P_{cyl}$ of the cylinder measured in real time.

Then, a morphological characteristic (moment) of the combustion pressure waveform is calculated by calculating a probability distribution based on the detected combustion pressure of the cylinder (S103).

The moment is a quantitative characteristic of the probability distribution, and when it is applied to a combustion pressure waveform, the morphological characteristics of the combustion pressure waveform can be quantified.

The morphological characteristics of the combustion pressure may be represented by the quantitative values of mean, variance, skew, and kurtosis.

The moment may be calculated by the following equation (3).

$$\text{Moment}_n = \int_{\theta_n}^{\theta_n} (\theta - \theta_c)^n P_{cyl}(\theta) \, d\theta \qquad \text{equation (3)}$$

Here, n is 1 to 4, $\theta_c$ is a mean value of the combustion pressure waveform, and $P_{cyl}(\theta)$ is a combustion pressure of the cylinder at $\theta$. The mean value at n=1 is applied, the variance at n=2 is applied, the skew at n=3 is applied, and the kurtosis at n=4 is applied to calculate quantitative values.

Then, the EGR rate is calculated using the calculated feature, moment, and engine operating conditions (S104).

The EGR rate $\hat{dm}_{Ey}$ may be calculated by considering a predetermined value ($dm_{Mafdset}$) of the mass flow rate of air, an engine speed ($N_{Eng}$), a value (MFB5-ST) obtained by subtracting the spark timing from a crank angle at the time when combustion is advanced by 5% (MFB5), the feature, and the moment.

That is, the EGR rate may be calculated by the following equation (4).

$$\hat{dm}_{Ey} = f(dm_{Mafdset}, N_{Eng}, MFB5-ST, \ldots, \text{Feature}_{i,j}, \ldots, \text{Moment}_{n,m}, \ldots) \qquad \text{equation (4)}$$

Here, $\hat{dm}_{Ey}$ is the EGR rate, $dm_{Mafdset}$ is a set value of the air mass flow rate, $N_{Eng}$ is an engine speed, MFB5 is a crank angle at the time when the combustion has proceeded by 5%, and ST is the spark timing.

That is, the EGR rate $\hat{dm}_{Ey}$ may be calculated by considering a predetermined value ($dm_{Mafdset}$) of the air mass flow rate, an engine speed ($N_{Eng}$), a value (MFB5-ST) obtained by subtracting the spark timing from the crank angle at the time when combustion is advanced by 5%, the feature, and the moment.

Then, the EGR rate is controlled based on the calculated EGR rate and a target EGR rate (S105). The EGR rate may be controlled by adjusting the opening amount of an EGR valve or the like.

FIGS. 2A-2H are drawings illustrating a correlation of a feature, which is calculated in the method of calculating an EGR rate using a combustion pressure of a cylinder according to an exemplary embodiment of the present disclosure, the engine driving condition, and the EGR rate.

Referring to FIGS. 2A-2H, it can be confirmed that the EGR rate is calculated differently depending on the engine speed N, the mass flow rate of air flowing into the engine, and the feature. The engine speed N was set to 1500 rpm and 3000 rpm, and the mass flow rate of air was set to 350 mg and 650 mg per one stroke (str). Based on the combustion pressure of the cylinder, the feature through the PCA is calculated in the range of about −270 to about −84. As a result of calculating the EGR rate by combining the engine speed N, the mass flow rate of air and the feature, it is confirmed that the larger the engine speed N, the air mass flow rate and the feature, the larger the EGR rate is calculated.

FIGS. 3A-3H are drawings illustrating a correlation of a moment, which is calculated in the method of calculating an EGR rate using a combustion pressure of a cylinder according to an exemplary embodiment of the present disclosure, the engine driving condition, and the EGR rate.

Referring to FIGS. 3A-3H, as in FIGS. 2A-2H, the engine speed N was set to 1500 rpm and 3000 rpm, and the mass flow rate of air was set to 350 mg and 650 mg per one stroke (str). Based on the combustion pressure of the cylinder, the moment through probability distribution calculation is calculated in the range of about 6 to about 65. As a result of calculating the EGR rate by combining the engine speed N, the air mass flow rate and the moment, it is confirmed that the larger the engine speed N and the air mass flow rate, the larger the EGR rate is calculated. Also, it is confirmed that the larger the value of the moment, the smaller the EGR rate is calculated.

The EGR rate $\hat{dm}_{Ey}$ can be finally calculated in consideration of the result of applying the features and moments of FIGS. 2 and 3, the air mass flow rate, the engine speed N, and the like.

Figure 4:
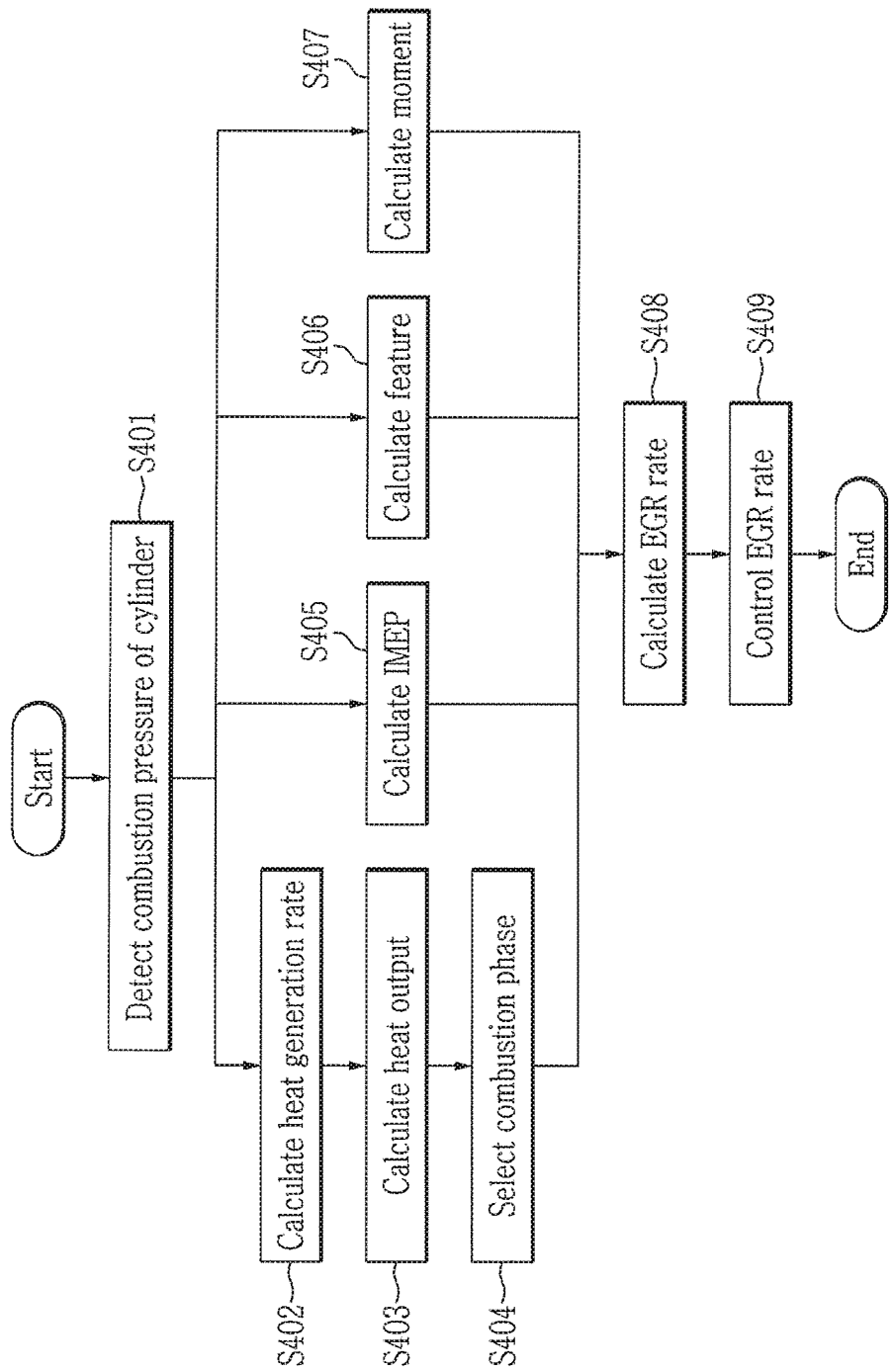
FIG. 4 is a flowchart illustrating a method of calculating an EGR rate using combustion pressure of cylinder according to another exemplary embodiment of the present disclosure.

FIG. 4 is a flowchart illustrating a method of calculating an EGR rate using a combustion pressure of a cylinder according to another exemplary embodiment of the present disclosure.

Referring to FIG. 4, the combustion pressure of the cylinder is detected (S401). The combustion pressure of the cylinder may be detected by a pressure sensor. At least one of the cylinders may be used, and one or more pressure sensor may be disposed corresponding to the at least one of the cylinders.

Then, heat generation rate $$\frac{dQ}{d\theta}$$

is calculated (S402). In order to calculate the heat generation rate, the specific heat ratio $\gamma$, the cylinder volume $V_{cyl}$, and the cylinder combustion pressure $P_{cyl}$ are input. The specific heat ratio $\gamma$ is a value preset by a data map or the like, and the cylinder volume $V_{cyl}$ is a value preset in accordance with the crank angle.

The combustion pressure $P_{cyl}$ of the cylinder is a value that can be detected through the pressure sensor. Therefore, the heat generation rate $$\frac{dQ}{d\theta}$$

of the cylinder may be calculated from the combustion pressure $P_{cyl}$ of the cylinder detected in real time through the pressure sensor.

The heat generation rate $$\frac{dQ}{d\theta}$$

may be calculated by the following equation (5).

$$\frac{dQ}{d\theta} = \frac{\gamma}{\gamma-1} P_{cyl} \frac{dV_{cyl}}{d\theta} + \frac{1}{\gamma-1} V_{cyl} \frac{dP_{cyl}}{d\theta} \qquad \text{equation (5)}$$

Here, $\gamma$ is the specific heat ratio, $P_{cyl}$ is the combustion pressure of the cylinder, $V_{cyl}$ is the cylinder volume, and $\theta$ is the crank angle.

Then, the cumulative value of the heat generation rate, that is, a heat output Q is calculated from the heat generation rate (S403).

The heat output Q may be calculated by the following equation (6).

$$Q = \frac{\gamma}{\gamma-1}\int P_{cyl}\frac{dV_{cyl}}{d\theta}d\theta + \frac{1}{\gamma-1}\int V_{cyl}\frac{dP_{cyl}}{d\theta} \qquad \text{equation (6)}$$

Then, a combustion phase is selected (S404). The combust phase may be selected from any one of MFB5, MFB10, MFB50 and MFB90 depending on the time point at which the combustion has progressed, in which MFB refers to a mass fraction burned. MFB5 is a crank angle at the time when the combustion progressed by 5%, MFB10 is a crank angle at the time when the combustion progressed by 10%, MFB50 is a crank angle at the time when the combustion progressed by 50%, and MFB90 is a crank angle at the time when the combustion progressed by 90%.

Then, an indicated mean effective pressure (IMEP) is calculated (S405). The IMEP may be calculated from the exhaust volume $V_d$, the cylinder combustion pressure $P_{cyl}$, and the cylinder volume $V_{cyl}$.

The IMEP may be calculated by the following equation (7).

$$IMEP = \frac{1}{V_d}\int_{-360}^{360} P_{cyl}\frac{dV_{cyl}}{d\theta}d\theta \qquad \text{equation (7)}$$

Here, $V_d$ is the engine exhaust volume.

Then, based on the detected cylinder combustion pressure, the feature is calculated through principal component analysis (S406), and based on the detected combustion pressure of the cylinder, the moment is calculated through the calculation of the probability distribution (S407). The method of calculating the features and moments is the same as that described with reference to FIG. 1, therefore it will be omitted hereinafter.

Then, the EGR rate is calculated using the calculated heat output Q, the combustion phase, the IMEP, the feature, and the moment S408.

Then, the EGR rate is controlled based on the calculated EGR rate and the target EGR rate S409. The EGR rate can be controlled by adjusting the opening amount of the EGR valve or the like.

The method of the various embodiments for a vehicle disclosed herein can be performed by a controller such as an engine control unit (ECU) provided in the vehicle or may be executed by a computing system which includes at least one processor which is a central processing unit (CPU) for processing instructions stored in a memory and/or a storage. Thus, the operations of the methods or algorithms described in connection with the embodiments disclosed in the specification may be directly implemented with a hardware module, a software module, or combinations thereof, executed by the processor. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

According to the exemplary embodiments of the present disclosure, it is possible to improve the estimation accuracy of the EGR rate by using the feature and the moment together with the combustion phase information.

In addition, it is possible to accurately and quickly calculate the EGR rate to improve the combustion stability and the exhaust gas quality, and to reduce the abnormal vibration and noise generated in the combustion process of the engine.

Furthermore, by calculating the EGR rate through the pressure sensor, it is possible to delete the calculation of the EGR rate through the separate oxygen sensor.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method of calculating an exhaust gas recirculation (EGR) rate using a combustion pressure of a cylinder of an internal combustion engine, the method comprising steps of:
    detecting, by a pressure sensor, the combustion pressure of the cylinder in real time;
    calculating, by a processor, a data characteristic of a combustion pressure waveform per cycle through a principal component analysis (PCA) based on the detected combustion pressure of the cylinder;
    calculating, by the processor, a moment of the combustion pressure waveform per cycle by calculating a probability distribution based on the detected combustion pressure of the cylinder;
    calculating, by the processor, the EGR rate using the calculated data characteristic, the calculated moment, and engine operating conditions; and
    controlling, by the processor, the EGR rate based on the calculated EGR rate and a target EGR rate.

2. The method of claim 1,
    wherein, in the step of calculating the data characteristic, a data set of combustion pressure waveform at each cycle is obtained such that a singular vector is calculated from a singular value decomposition (SVD) from the combustion pressure data set,
    wherein the data characteristic is calculated by multiplying the combustion pressure of the cylinder and the singular vector.

3. The method of claim 2,
    wherein, in the step of calculating the moment, the moment is calculated by the following equation:

$$\text{Moment}_n = \int_{\theta_n}^{\theta_n} (\theta - \theta_c)^n P_{cyl}(\theta)\,d\theta,$$

wherein n is 1 to 4, $\theta_c$ is a mean value of the combustion pressure waveform per cycle, and $P_{cyl}(\theta)$ is a combustion pressure at $\theta$.

4. The method of claim 3, wherein:
    wherein, in the step of calculating the EGR rate, the EGR rate is calculated by using a predetermined air mass flow rate, an engine speed, a value obtained by subtracting a spark timing from a crank angle when combustion is advanced by 5%, the calculated data characteristic, and the calculated moment.

5. The method of claim 1,
    wherein the step of detecting the combustion pressure includes detecting at least one of a plurality of cylinders, and wherein one or more pressure sensors are disposed corresponding to the at least one of the plurality of cylinders.

6. The method of claim 1, further comprising, after the step of detecting the combustion pressure:
calculating a heat generation rate;
calculating a heat output;
selecting a combustion phase; and
calculating an indicated mean effective pressure (IMEP).

7. The method of claim 6,
wherein the heat generation rate is calculated by using a specific heat ratio of the gas, a volume of the cylinder, and the combustion pressure of the cylinder.

8. The method of claim 6, wherein the combust phase is selected from any one of crank angles for 5%, 10%, 50%, and 90% mass fraction burned.

9. The method of claim 6, wherein the IMEP is calculated by using an exhaust volume, the combustion pressure of the cylinder, and a volume of the cylinder.

10. The method of claim 1,
wherein the EGR rate is controlled by adjusting an opening amount of an EGR valve.

11. A non-transitory computer readable medium comprising computer executable instructions execution of which causes the processor to perform the method of claim 1.

* * * * *